United States Patent [19]

Fujita et al.

[11] Patent Number: 4,721,429

[45] Date of Patent: Jan. 26, 1988

[54] TRAVERSING APPARATUS FOR LONG AND HEAVY ARTICLE

[75] Inventors: Yoshitada Fujita, Kobe; Sadashi Hanada, Miki, both of Japan

[73] Assignee: Kawasaki Jukogyo Kabushiki Kaisha, Japan

[21] Appl. No.: 807,692

[22] Filed: Dec. 11, 1985

[30] Foreign Application Priority Data

Dec. 24, 1984 [JP] Japan ................................ 59-272557

[51] Int. Cl.[4] ................................................ B60P 3/40

[52] U.S. Cl. .................................... 414/458; 414/786; 414/495; 187/9 R; 254/2 R

[58] Field of Search ............... 414/458, 459, 460, 461, 414/495, 786; 187/9 R; 254/2 R, 45, 7 R

[56] References Cited

U.S. PATENT DOCUMENTS

| | | | |
|---|---|---|---|
| 3,327,996 | 6/1967 | Morse | 414/458 X |
| 3,405,781 | 10/1968 | Brown | 254/7 R X |
| 3,631,999 | 1/1972 | Walerowski | 414/458 |
| 3,817,401 | 6/1974 | Becuer | 414/12 |
| 4,200,419 | 4/1980 | Rogers, Jr. | 414/12 |

FOREIGN PATENT DOCUMENTS

| | | | |
|---|---|---|---|
| 46-16684 | 5/1971 | Japan . | |
| 71013 | 8/1927 | Sweden | 104/262 |

*Primary Examiner*—Frank E. Werner
*Attorney, Agent, or Firm*—Leydig, Voit & Mayer

[57] ABSTRACT

An apparatus for traversing a long and heavy article having at least two traversing units each having two trucks, at least one of which being a driving truck having a driving system, while the other may be an auxiliary truck devoid of the driving system. The driving truck is equipped with a truck frame, driving wheels, driving system, lifting device and a steering device. The auxiliary truck can have the same construction as the driving truck, although it is devoid of the driving system. Alternatively, both of the trucks of each traversing unit may be the driving trucks.

8 Claims, 17 Drawing Figures

TRAVERSING APPARATUS FOR LONG AND HEAVY ARTICLE

BACKGROUND OF THE INVENTION

The present invention relates to a traversing method and apparatus for long and heavy articles such as railroad vehicles, containers, large-sized trucks and so forth.

A conventional method for laterally transferring a vehicle such as a railroad car from one railroad track to another employs a traverser which is situated at a specific location. The traverser is installed in a pit which is recessed from the track plane. In transferring the vehicle, the vehicle is brought onto the traverser by being pulled or pushed by a suitable tracting or pushing vehicle and the traverser is moved to the position of the other railroad track, thereby transferring the vehicle to the other railroad track. This method is disclosed in, for example, Japanese Examined Patent Publication No. 16684/1971 (JP-B-46-16684).

Methods are also known in which the vehicle is lifted by a pair of wrecking vehicles or by means of an overhead crane through wire ropes and transferred to the other railroad track. It is also known to make use of an air bearing.

These known methods, however, involve the following problems or drawbacks.

The first-mentioned method, relying upon a traverser situated in a pit recessed from the track plane, encounters the following problems:

(a) Much money and construction work are required for the installation of the traverser.

(b) The installation space is exclusively occupied by the traverser and cannot be utilized for other purposes.

(c) There is a restriction of the space for installing the traverser.

(d) Since the traverser runs in a pit which is recessed under the ground surface, there is a risk that a person can fall into the pit.

(e) The vehicle to be transferred has to be moved onto the traverser by another vehicle.

(f) When a second vehicle not to be transferred is between the vehicle to be transferred and the traverser, the second vehicle also must be transferred to another track by means of the traverser.

On the other hand, the second-mentioned method which employs wrecking vehicles or an overhead crane for lifting the vehicle encouters the following problems:

(g) The traversing operation is possible only within the reach of the overhead crane.

(h) There is a risk of damaging of the vehicle through collision with obstacles due to swing of the lifted vehicle.

(i) The wrecking vehicle or the overhead crane has to be arranged at least in a pair because the vehicle usually has a large length.

(j) It takes a considerable time for suppressing the lateral swing of the vehicle, so that the transfer to the other rail tracks requires much time and labour.

(k) Before lifting the vehicle, it is necesary to securely fix the bogie to the vehicle body to prevent it from coming off. Alternatively, another bogie has to be stationed on the other railroad track and the vehicle body separated from the old bogie transferred to the other bogie on the other railroad track. Such work is labourious and necessitates another bogie.

In addition, the known methods explained above commonly face the following problem:

(1) In factories for assembling railroad vehicles, the railroad tracks may terminate at the ends of the yards. In such a case, it is impossible to adopt the tact type production system in which the product vehicles are sent one by one, insofar as the known traversing methods are employed.

SUMMARY OF THE INVENTION

Accordingly, it is a primary object of the invention to provide a traversing method and apparatus which allow, by a simple and reasonable arrangement, safe and quick traverse of an object anywhere, at any time desired without encountering any restriction of the traverse position and without requiring shifting of any obstacles, such as another vehicle, thereby overcoming the above-described problems of the prior art.

To these ends, according to one aspect of the invention, there is provided a traversing method for a long and heavy article comprising the steps of: preparing at least two traversing units each having two traversable trucks arranged on a flat area at which traverse takes place, the trucks of each traversing unit being adapted to be arranged on the left and right sides of the article, respectively; lifting the article on the area to a level high enough to permit the article to clear any obstacle during traversing by the at least two traversing units; and causing the traversing units to traverse by their own power in a different direction from that of the axis of the article.

According to another aspect of the invention, there is provided a traversing apparatus for long and heavy article having a plurality of independent trucks, preferably four, including two driving trucks and auxliary trucks corresponding in number to the driving trucks; each truck including a truck frame; support wheels mounted under the truck frame, and a guide wheel; the two driving trucks including, as one of the support wheels, at least one driving wheel; and a driving unit for operating the driving wheels. Each of all four or more trucks includes a lifting means for lifting and lowering the article to and from a predetermined level and a steering means for steering the guide wheel to steer the truck to any desired position. The auxiliary trucks have the same construction as the driving trucks except that they lack the driving system; the driving truck and the auxliary truck are adapted to be arranged on both sides of the article such that the opposing driving truck and auxiliary truck in combination constitute a traversing unit.

Alternatively, the traversing apparatus of the invention may employ four driving truck of the same construction as that shown above.

The invention offers the following advantages:

(a) Traversing of long and heavy article such as a vehicle can be conducted regardless of the place or position, provided that the floor surface is flat, unlike the conventional arrangement in which the traversing function is available only at a limited place where the traverser is located.

(b) Since the traverse trucks are mobile, they can be brought to anywhere as desired.

(c) The traversing apparatus can apply not only to the vehicles but also to other long articles as well.

(d) Installation cost is remarkably reduced as compared with the conventional system which employs wrecking vehicles or overhead cranes.

(e) Even when long and heavy vehicles are successively moved into the end of yard, it is possible to transfer only a selected vehicle without requiring shifting of other vehicles.

(f) It is not necessary to pull or push the vehicle to the traversing position.

(g) The setting of the traverser trucks can be done in a short time and the traverse can be conducted quickly without risk of damaging the long and heavy article such as a vehicle.

(h) Where the long and heavy article is a vehicle, the bogie can be lifted together with the vehicle body, so the bogie need not be fixed to the vehicle body.

(i) After being set under the vehicle, the traverser trucks can be moved together or independently of each other. In addition, the positioning operation during lowering of the vehicle is facilitated.

DESCRIPTION OF THE PREFERRED EMBODIMENTS

Figure 1:
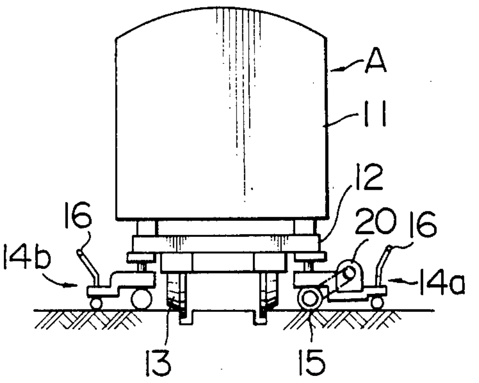
FIG. 1 is a front elevational view of an embodiment of a traversing apparatus in accordance with the invention in the state set under a vehicle.
Figure 2:
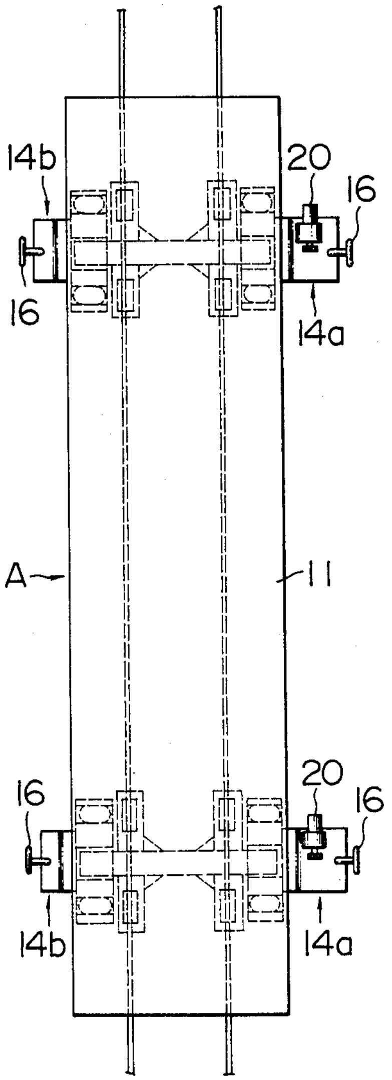
FIG. 2 is a plan view of the traversing apparatus of the invention in the same state as FIG. 1.
Figure 3:
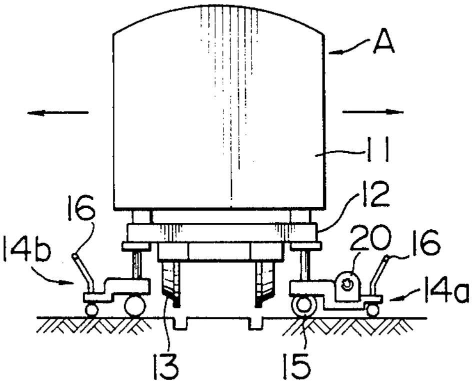
FIG. 3 is a front elevational view of the traversing apparatus as shown in FIG. 1 in the state after lifting of the vehicle.

FIGS. 1, 2 and 3 show a traversing apparatus of the invention which employs a plurality of traversing units each having a driving truck and an auxiliary truck, and intended for the traversing of a railroad vehicle from one railroad track to another.

Referring to these Figures, a numeral 11 denotes the body of a railroad vehicle A which is carried by a body bolster 12 of a bogie adapted to run along a railroad track. The bogie has wheels 13. The apparatus has a self-propelled driving truck 14*a* equipped with a driving unit and an auxiliary truck 14*b* which is not power-driven. These two types of trucks 14*a* and 14*b* are arranged to oppose each other thereby forming a traversing unit.

Figure 4:
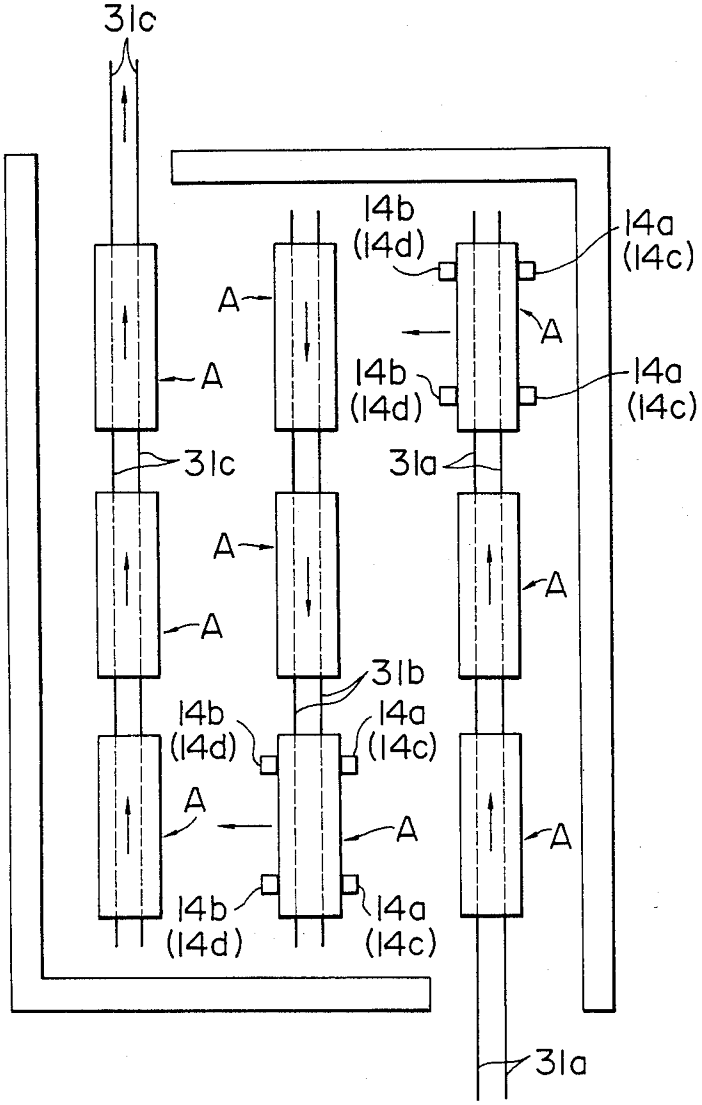
FIG. 4 is a plan view illustrating an embodiment of the traversing method of the invention.

FIG. 4 is a plan view showing an embodiment of the traversing method in accordance with the invention. Railroad vehicles are successively assembled and moved along a railroad track 31*a* which is terminated at its one end. The traversing apparatus of the invention is effectively used in laterally transferring each vehicle A from one railroad track, e.g. 31*a*, to another railroad track, e.g. 31*b*, and vice versa. To this end, a plurality of traversing units, each consisting of a driving truck 14*a* and an auxiliary truck 14*b*, are set under the vehicle A to be transferred. The driving trucks and the auxiliary trucks have support wheels mounted under the truck frames. More specifically, the traversing units are set under the body bolster 12 of the vehicle A, in a manner shown in FIGS. 1 to 3. Then, the lifting means of the trucks 14*a*, 14*b* are operated so as to lift the vehicle A to a predetermined height above the ground surface, and the driving trucks 14*a* traverse the railroad track, thus laterally shifting the railroad vehicle A.

The setting of the traversing units are conducted as follows: The driving trucks 14*a* and the auxiliary trucks 14*b* are pooled in a suitable truck pool (not shown) when they are not used. From the pool, the driving trucks 14*a* run to the desired positions under the vehicle A by its propelling power. During running, the truck 14*a* is steered by means of a steering handle bar 16 which changes the direction of the guide wheel 23. On the other hand, the auxiliary trucks 14*b* are moved to the desired positions by manual effort, while being steered in the same manner as the driving truck 14*a*. Finally, the trucks 14*a*, 14*b* are set under the vehicle A as shown in FIGS. 1 and 2.

A description will be made hereinunder as to the construction of the driving truck 14*a* which constitutes a part of the traversing unit in the traversing apparatus of the invention, with reference to FIGS. 5 to 7.

Figure 5:
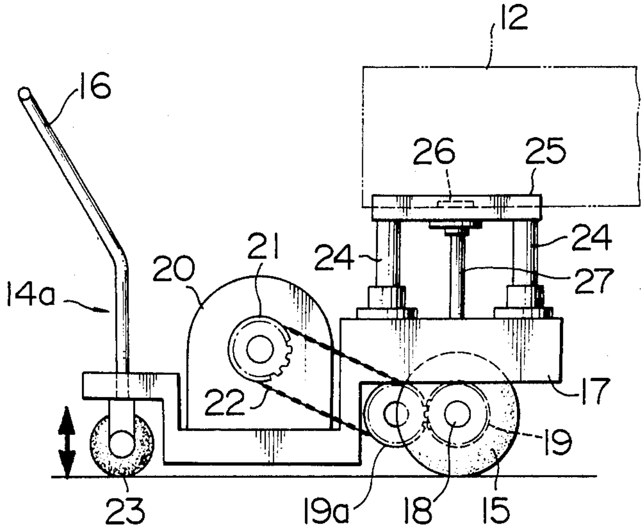
FIG. 5 is a side elevational view of a driving truck incorporated in a traversing apparatus of the invention.
Figure 6:
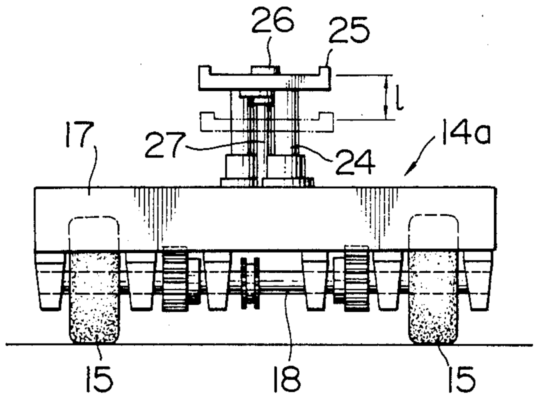
FIG. 6 is a front elevational view of the driving truck as shown in FIG. 5.
Figure 7:
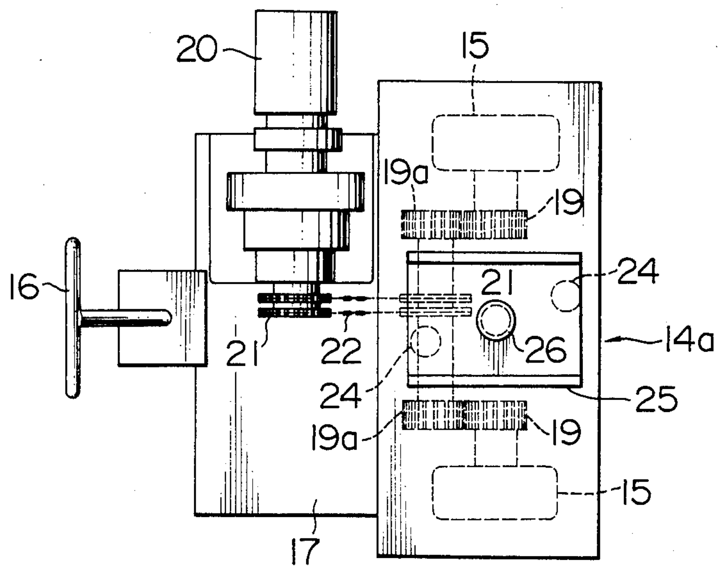
FIG. 7 is a plan view of the driving truck as shown in FIG. 5.

FIGS. 5, 6 and 7 are a side elevational view, a front elevational view and a top plan view of the driving truck 14*a* which is set under the body bolster 12 along one lateral side of the latter. The driving truck 14*a* has a truck frame 17. A pair of support wheels serving as driving wheels 15 are connected to a wheel axle 18 which is journaled on the front underside of the truck frame 14*a*. The wheel axle 18 has a gear 19 meshing with a gear 19*a* which is driven by a driving power unit 20 carried by the truck frame 17 through a driving power transmission including a sprocket 21, chain 22 and so forth. Preferably, a suitable disconnecting means such as a clutch (not shown) is provided in the transmission so that the driving wheels 15 are disconnected as desired from the power train to allow the driving truck 14*a* to be pushed and pulled by manual force. It is also preferred that a speed changing gear (not shown) be provided in the power unit 20 so that the driving wheel 14*a* can reach the aimed position quickly.

A guide wheel 23 provided on the rear side of the truck frame 17 is adapted to be steered by the steering handle bar 16 the steering function of which can be nullified after the setting of the truck 14*a*. The guide wheel 23 is so constructed that it can be raised above the ground surface after the truck 14*a* is set. The truck frame 17 carries at its upper front side a plurality of extensible and retractable guide rods 24 the upper ends of which are connected to the underside of a vehicle supporting member 25 as best seen from FIG. 5. The vehicle supporting member 25 is provided with a protruding means, herein shown as a pair of upwardly directed flanges, and a stopper protrusion 26 which is adapted to be received in means including a recess (not shown) formed in the underside of the body bolster 12, thereby connecting and fixing the vehicle supporting member 25 to the body bolster 12 against any lateral movement. Namely, the vehicle A is prevented from accidentally coming off from the driving truck 14*a* during traversing. Each truck may be steered and set into position under the connecting means on the underside of the vehicle A with the support wheels of each truck aligned in a common orientation with support wheels of the other trucks set under the vehicle A, allowing the vehicle A to be traversed when carried by the trucks in the direction determined by the common orientation of the support wheels, the guide wheels being lifted out of engagement with the ground surface.

A reference numeral 27 designates a jack which may be a hydraulic jack or a screw jack driven by an electric motor. The upper end of the hydraulic jack 27 is connected to the center of the underside of the vehicle supporing member 25. The arrangement is such that the vehicle supporting member 25 is moved up and down by a predetermined stroke l as shown in FIG. 6, as a power source (not shown) such as a hydraulic pump operates. When the member 25 has been lifted to the upper end of its stroke l, the vehicle A leaves the ground surface, whereas when the same is in the lower end of its stroke, the vehicle supporing member 25 is separated from the body bolster 12.

Figure 8:
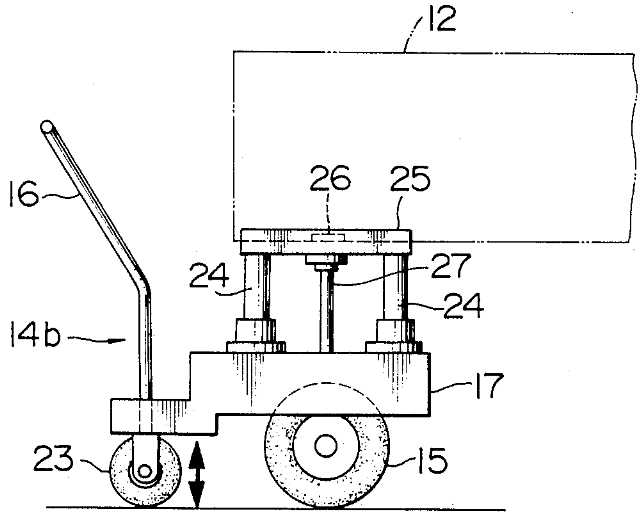
FIG. 8 is a side elevational view of an auxiliary truck incorporated in the traversing apparatus of the invention.

FIG. 8 shows the auxiliary truck 14*b* in side elevation. The auxiliary truck 14*b* has a basic construction which is substantially the same as that of the driving truck 14*a*, although it is devoid of the self-propelling means including the power unit 20, sprockets 19, 21 and chain 22. Therefore, the parts of the auxiliary truck 14*b* common to those of the driving truck 14*a* are denoted by the same reference numerals. As stated before, the auxiliary truck 14*b* constitutes, in combination with the opposing driving truck 14*a*, a traversing unit capable of laterally traversing the vehicle A.

Figure 9:
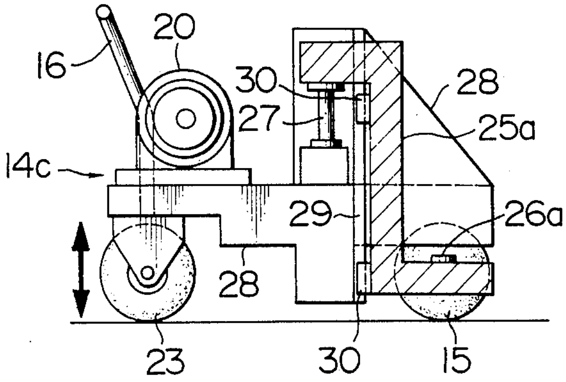
FIG. 9 is a partly-sectioned side elevational view of a modification of the driving truck shown in FIG. 5.
Figure 11:
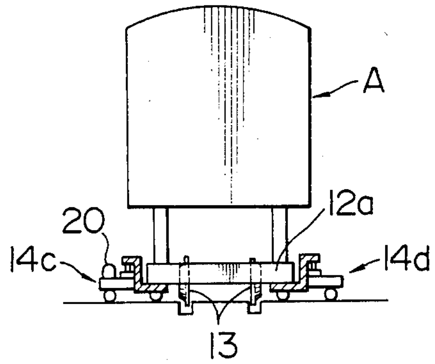
FIG. 11 is a partly-sectioned front elevational view of traversing apparatus similar to that shown in FIG. 1, showing a different embodiment which incorporates the driving trucks shown in FIG. 9.
Figure 10:
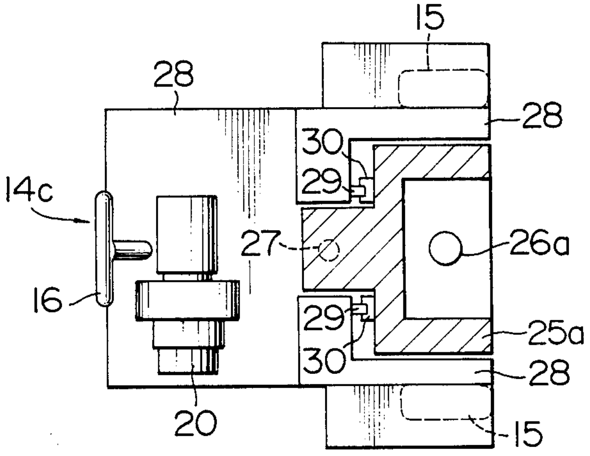
FIG. 10 is a partly-sectioned plan view of the driving truck as shown in FIG. 9.

FIGS. 9 to 11 in combination show modified trucks 14*c* and 14*d*. In this case, the vehicle supporting member 25*a* is arranged such that it can support the body bolster 12*a* even when the height of the latter is extremely low. The function of the vehicle supporting member 25*a* is the same as the vehicle supporting member 25 used in the driving vehicle 14*a* and the auxiliary truck 14*b* of the first embodiment. The driving and auxiliary trucks of this modification are denoted by numerals 14*c* and 14*d*, respectively. The vehicle supporting member 25*a* has a substantially Z-shaped configuration with an elongated vertical portion when viewed in a vertical section, with the lower side thereof disposed in the close proximity of the ground surface. The stopper protrusion 26*a* is provided on the upper surface of this lower side of the member 25*a*. The vehicle supporting member 25*a* is mounted on the frame 28 of the truck such that it can be moved up and down by a hydraulic jack 27 (or a screw jack driven by an electric motor) acting between the frame 28 and the lower surface of the upper side of the vehicle supporing member 25*a*. For the purpose of smoothing this vertical movement of the vehicle supporting member 25*a* and, hence, preventing vibration of the vehicle supporting member 25*a*, a vertical guide 30 provided on a vertical surface of the vehicle supporting member 25*a* slidably fits on a pair of vertical guide rails 29 provided on the truck frame 28. In FIGS. 9 and 10, the same reference numerals are used to denote the same members or parts as those used in FIGS. 5 to 7 which show a first embodiment. It will be clear to those skilled in the art that the auxiliary truck 14*d* shown in FIG. 11 has a construction which is substantially the same as that of the driving truck 14*c* explained in connection with FIGS. 9 and 10, except that it lacks the self-propelling system.

In moving the vehicle A up and down, the hydraulic jacks 27 (or screw jacks driven by electric motors) of the driving and auxiliary trucks 14*a*, 14*c*; 14*b*, 14*d* on both sides of the vehicle A have to operate strictly at an equal rate, in order to prevent the vehicle A from accidentally turning sideways. This can be achieved basically through cooperation of two persons. Namely, assuming here that the vehicle is to be supported at its one longitudinal end by a traversing unit composed of the driving and auxiliary trucks 14*a*, 14*b* (or 14*c*, 14*d*) and at its other longitudinal end by another traversing unit, two operators first operate hydraulic pumps of opposing trucks 14*a*, 14*b* (or 14*c*, 14*d*) of the first traversing unit such that both sides of one end of the vehicle are lifted evenly. Then, the operators operate the hydraulic pumps of the other traverser unit such as to lift both sides of the other end of the vehicle evenly.

Alternatively, the traversing unit may be constructed such that the hydraulic jacks on both trucks 14*a*, 14*b* (or 14*c*, 14*d*) are operated by a single hydraulic pump which is mounted on either one of the trucks constituting the traversing unit. In such a case, an operator can actuate the hydraulic jacks on both trucks simultaneously, thereby evenly lifting both sides of the vehicle. Obviously, the manually operated hydraulic pump may be replaced by an electric motor.

An embodiment of the traversing method in accordance with the invention will be explained hereinunder with reference to FIGS. 12 to 14.

As will be understood from these Figures, a circuit for controlling the operation of the traversing apparatus has an independent-operation switch unit S1 for actuating each driving truck 14*a* independently, a simultaneous-operation switch unit S2 for actuating the driving trucks 14*a* of all the traversing units simultaneously, and an operation switch unit S3 which is provided with emergency stop switches EMS-2 and EMS-3. In addition, each driving truck 14*a* is provided with forward push button switches PB-4, PB-6 and backward push button switches PB-5, PB-7, which are used in the independent operation mode of the apparatus.

Figure 14:
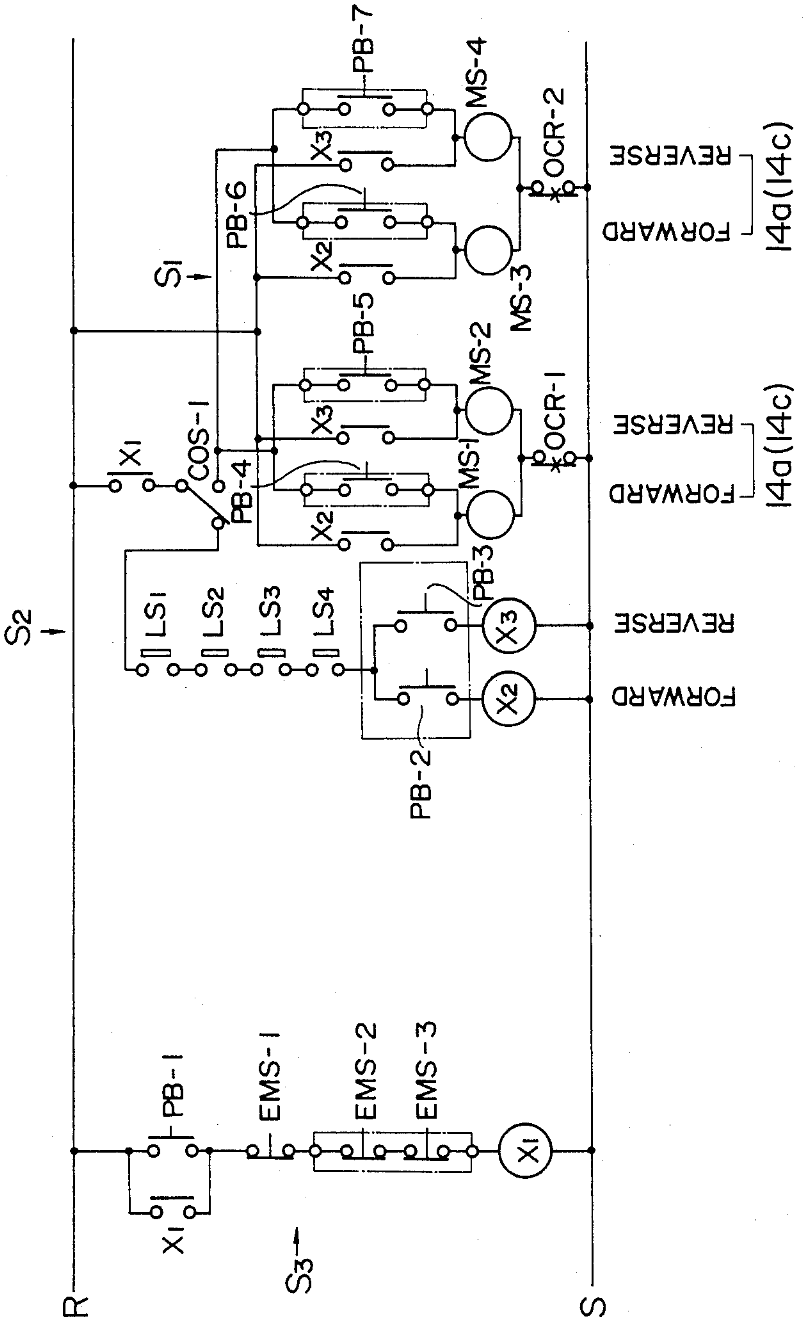
FIG. 14 is a control circuit diagram of the circuit for controlling the power circuit as shown in FIG. 13.

For setting the traversing units, the operator first pushes the push button switch PB-1 shown in FIG. 14 and then turns the change-over switch COS-1 to select the switch unit S1, i.e. the independent operation mode. In this state, each of the driving trucks 14*a* can be operated independently as the associated independent operation switch PB-4, PB-5, PB-6 or PB-7 is pressed. In this manner, the independent driving trucks 14 are moved to the aimed positions and are set there under the vehicle A. After the setting of all traversing units, the change-over switch COS-1 is turned again to select the switch unit S2, and the push button switches PB-2 and PB-3 are operated so that the vehicle A traverses from the railroad truck 31*a* to another railroad track 31*b* and from the railroad track 31*b* further to still another railroad track 31*c* as shown in FIG. 4.

Relays X2 and X3 are not energized even though the switches PB-2 and PB-3 are depressed, unless limit switches LS1 to LS4 for detecting the vertical stroke limits of the screw jacks are operated.

After the vehicle A has traversed to the position above the railroad track 31*b*, if all the wheels of the vehicle A are aligned with the rails of the railroad track 31*b*, the vehicle A is gradually lowered until the wheels come to rest on respective rails. If, however, there is misalignment of the wheels with the rails, the change-over switch COS-1 is turned again to select the independent operation mode, and the positions of the driving trucks 14*a* are adjusted independently by means of the push button switches PB-4 to PB-7, until the wheels are brought into alignment with the rails.

After attaining the alignment, the vehicle A is lowered by the operation of the hydraulic jack or the screw jack, so that the wheels of the vehicle A come to rest on the rails of the railroad track 31*b*. The operation of the hydraulic jack or the screw jack is continued so that the vehicle supporting member 25 is further moved downward leaving the body bolster 12. Then, the driving truck 14*a* and the auxiliary track 14*b* are moved apart from each other outwardly from the vehicle, thus completing the traverse of the vehicle A.

Figure 12:
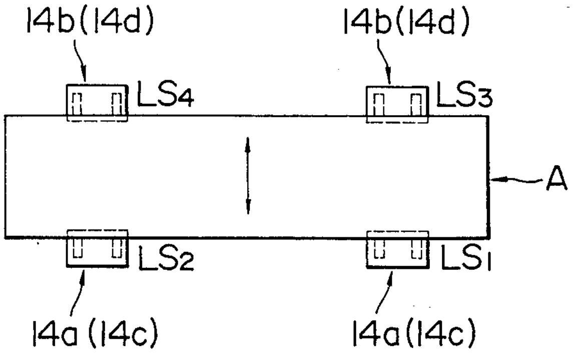
FIG. 12 is a plan view showing the general arrangement of a driving truck and an auxiliary truck.
Figure 13:
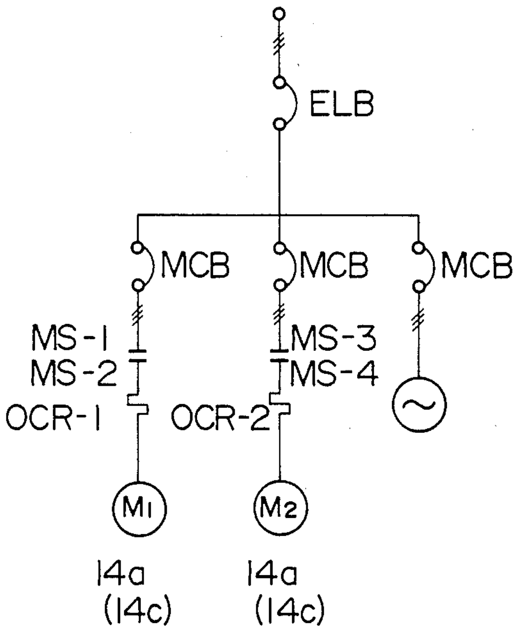
FIG. 13 is a power circuit diagram for the driving motor of the driving truck as shown in FIG. 12.

In FIGS. 12 to 14, a symbol ELB represents a leak current circuit breaker, MCB represents a circuit breaker, MS-1 to MS-4 represent magnet switches, OCR-1 and OCR-2 represent overcurrent relays, M1 and M2 represent driving motors for the driving trucks, and X1 to X3 represent relays.

A description will be made hereinunder as to the operation of an embodiment which incorporates screw jacks driven by electric motors, with reference to FIGS. 15 to 17.

In this case, the screw jacks of all the trucks 14*a*, 14*b* or 14*c*, 14*d* are provided with synchronous electric motors M3 to M6 of the same capacity, so that the trucks 14*a*, 14*b* or 14*c*, 14*d* of all the traversing units operate in synchronism such as to lift and lower their vehicle supporting mambers simultaneously. When the lifting and lowering operation of an independent truck is necessary, the change-over switch COS-2 is turned to the rightside contact in FIG. 17, and the lifting push button PB-11, PB-13, PB-15 or PB-17 of the desired truck is pushed so that the screw jack of the truck is operated to lift the vehicle supporting member independently of other trucks. Similarly, the lowering operation of a desired truck can be performed by pushing the lowering push button switch PB-12, PB-14, PB-16 or PB-18.

Figure 17:
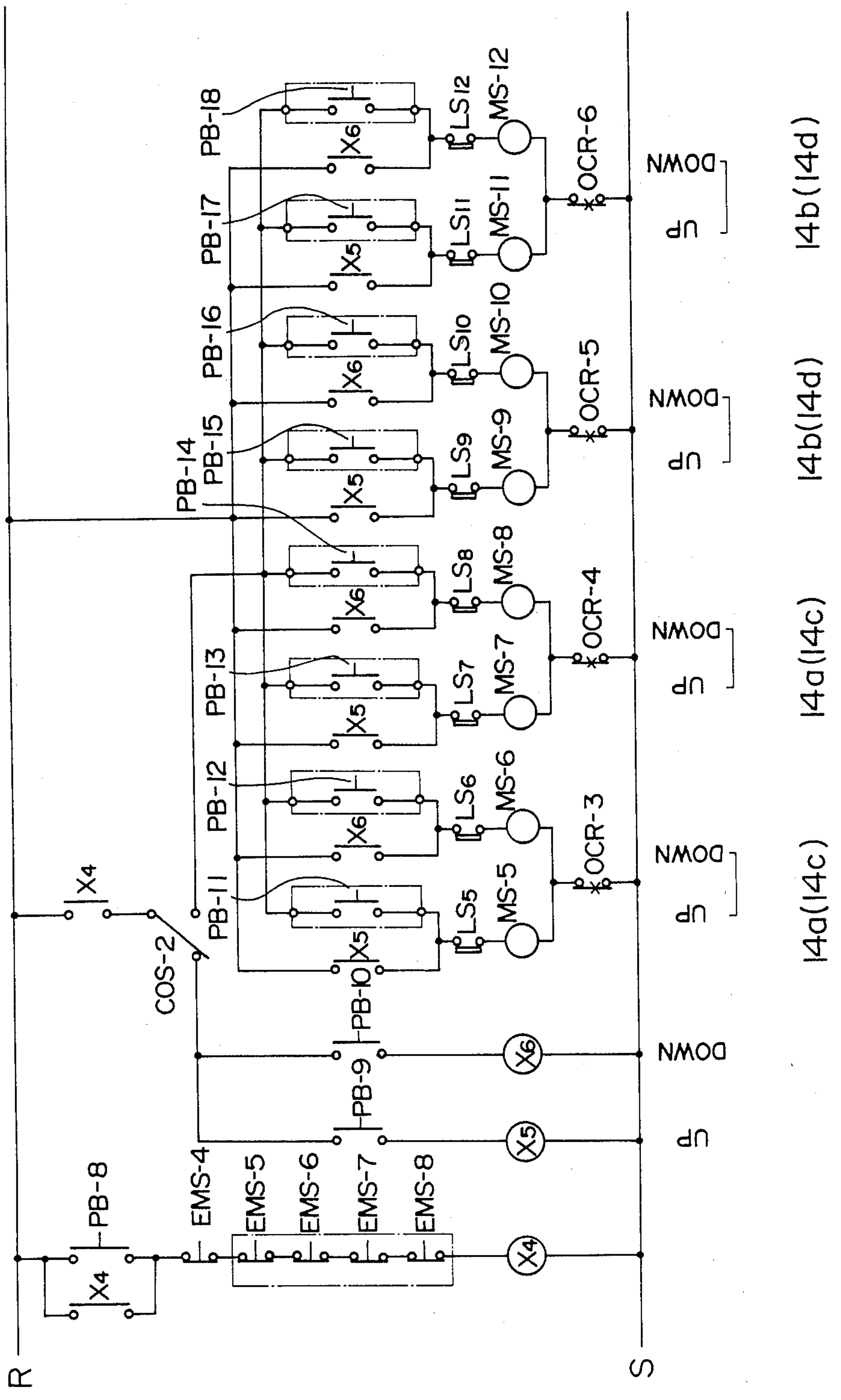
FIG. 17 is a control circuit diagram for controlling the power circuit shown in FIG. 16.

Conversely, when it is desired that the screw jacks of all the trucks are operated simultaneously, the change-over switch COS-2 is switched to the left side as viewed in FIG. 17 so as to select the simultaneous operation mode. Thereafter, the screw jacks of all the four trucks are operated for lifting and lowering operation, by operating push button switches PB-9 and PB-10, respectively.

The arrival at the upper and lower stroke ends are detected by respective limit switches LS5 to LS12 which in turn produce signals for stopping the associated synchronous motors M3 to M6.

Figure 15:
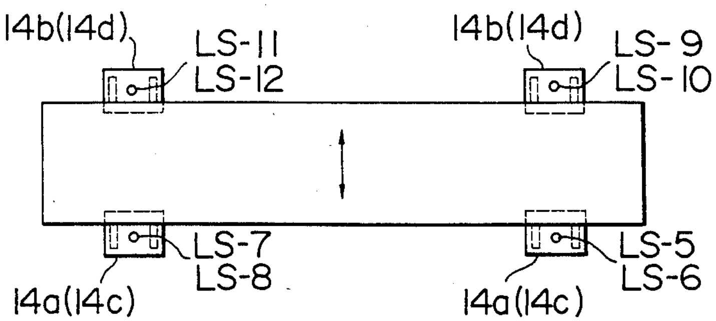
FIG. 15 is a plan view similar to FIG. 12, making use of an electrically driven screw jack.
Figure 16:
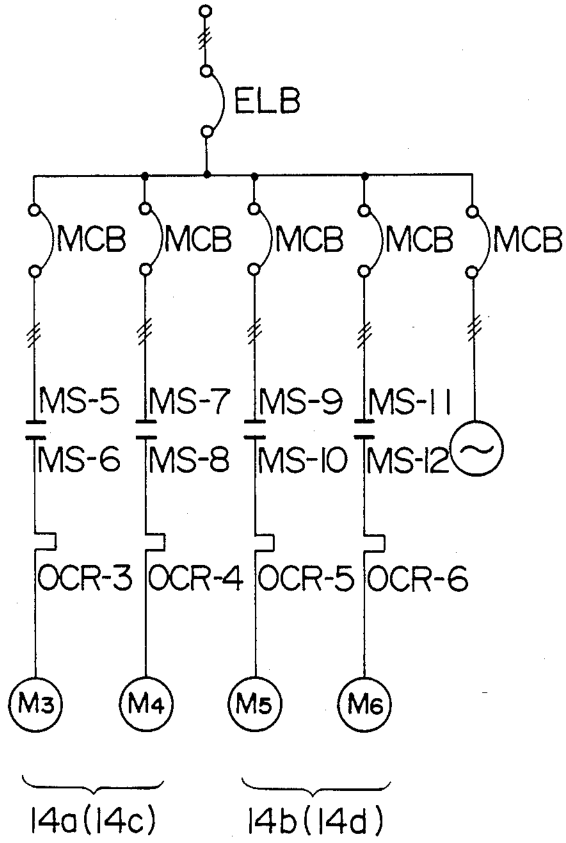
FIG. 16 is a power circuit diagram for the traversing apparatus shown in FIG. 15.

In FIGS. 15 to 17, ELB represents a leak current circuit breaker, MCB represents a circuit breaker, MS-5 to MS-12 represent magnet switches, OCR-3 to OCR-6 represent overcurrent relays, EMS-4 to EMS-8 are emergency stop switches, and X4 to X6 represent relays.

In the described embodiments, the traversing unit is composed of a driving truck 14*a* and an auxiliary truck 14*b* which are adapted to be set on the left and right sides of the vehicle A. This, however, is not exlusive and the traversing unit may be composed of two driving trucks of the same construction.

It will also be clear to those skilled in the art that the invention is applicable equally well to traversing of long and heavy articles or structures such as containers, large-size trucks and so forth, although the foregoing description specifically mentions railroad vehicles.

What is claimed is:

1. A traversing apparatus for a long and heavy article, said apparatus having four independent trucks, each truck being initially independently movable relative to the article and comprising:

a truck frame;

support wheels mounted under said truck frame to support the truck for movement on the ground surface;

a lifting means mounted on said truck frame for lifting and lowering an article to and from a predetermined level at which the article is to be carried by the trucks, including a vertically movable jack and an article supporting member connected to an upper end of said jack, said article supporting member being provided at an upper surface thereof with a protruding means which is adapted to connect with means including a corresponding recess formed in an underside of the article to fix said article supporting member against lateral movement relative to the underside of the article when said article supporting member is raised and is connected with the underside of the article;

a guide wheel mounted under said truck frame to steer and set the truck into a predetermined position under the connecting means on the underside of the article with said support wheels of each truck aligned in a precise common orientation with support wheels of the other trucks set under the article, allowing the article to be moved when carried by the four trucks in the direction determined by the common orientation of the support wheels, said guide wheel being movable to a level above the ground surface after the truck is set under said article;

the four independent trucks including two self-propelled driving trucks, each driving truck having a driving unit mounted on the truck frame and connected to operate one of said support wheels as a driving wheel to propel the truck and the article carried thereby on the ground surface in said direction;

whereby the article may be traversed by steering each truck manually into a predetermined position under the connecting means in the underside of the article with said support wheel of each truck aligned in a precise common orientation with support wheels of the other trucks set under the article, raising the article to a predetermined level by operating the lifting means on all four trucks and raising the guide wheels on all four trucks, and traversing the article by means of the driving units to propel the trucks and the article carried thereby on the ground surface in a direction determined by the orientation of the support wheels.

2. A traversing apparatus according to claim 1, the four independent trucks including two auxiliary trucks, each having support wheels and no driving unit.

3. A traversing apparatus according to claim 1, said vertically movable jack of each truck including a plurality of parallel bars carrying said support member.

4. A traversing apparatus according to claim 1, each truck including vertical guide rails and said vertically movable member including a vertical guide slidably fitting on said guide rails.

5. A traversing apparatus according to claim 1 including means connecting the vertically movable jacks on two of the trucks for simultaneous vertical movement at equal rates such that, with four independent trucks set under four corners of an elongated article and with the two trucks at each end, both sides of each end of the article are lifted evenly.

6. A traversing apparatus according to claim 5, one of the two trucks at one end of the article including a hydraulic pump connected to the other of the two trucks, means for controlling the operation of said hydraulic pump to operate hydraulic jacks on both of the two trucks simultaneously to evenly lift both sides of the end of the article.

7. A traversing apparatus according claim 1 including control means selectively connecting the drive units of two self-propelled driving trucks to operate simultaneously or independently for traversing the article when operated simultaneously and for precisely adjusting the positioning of the article when operated independently.

8. A traversing method for long and heavy articles, said method using four independent trucks, each truck having a truck frame; support wheels mounted under said truck frame to support the truck for movement on the ground surface; a lifting means mounted on said truck frame for lifting and lowering an article to and from a predetermined level at which the article is to be carried by the trucks, including a vertically movable jack and an article supporting member connected to an upper end of said jack; said article supporting member being provided at an upper surface thereof with a protruding means which is adapted to connect with means including a corresponding recess formed in an underside of the article to fix said article supporting member against lateral movement relative to the underside of the article when said article supporting member is raised and is connected with the underside of the article; a guide wheel mounted under said truck frame to steer the truck, said guide wheel being movable to a level above the ground surface; the four independent trucks including two self-propelled driving trucks, each driving truck having a driving truck mounted on the truck frame and connected to operate one of said support wheels as a driving wheel; said method comprising:

steering each truck manually into a predetermined position under connecting means provided on the underside at each corner of the article to locate the four trucks under corners of the article with said support wheels of each truck aligned in a precise common orientation with support wheels of the other trucks set under the article and in a given direction;

raising the article to the predetermined level by operating the lifting means on all four trucks and raising the guide wheels; and traversing the article by means of the driving units to propel the truck and the article carried thereby on the ground surface in the direction determined by the orientation of the support wheels.

* * * * *